(12) United States Patent
Chen et al.

(10) Patent No.: US 9,986,588 B2
(45) Date of Patent: May 29, 2018

(54) RANDOM ACCESS METHOD AND DEVICE

(71) Applicant: ZTE CORPORATION, Shenzhen (CN)

(72) Inventors: Zhongming Chen, Shenzhen (CN); Yada Huang, Shenzhen (CN)

(73) Assignee: ZTE CORPORATION (CN)

( * ) Notice: Subject to any disclaimer, the term of this patent is extended or adjusted under 35 U.S.C. 154(b) by 94 days.

(21) Appl. No.: 15/024,503

(22) PCT Filed: Apr. 16, 2014

(86) PCT No.: PCT/CN2014/075506
§ 371 (c)(1),
(2) Date: Mar. 24, 2016

(87) PCT Pub. No.: WO2014/176977
PCT Pub. Date: Nov. 6, 2014

(65) Prior Publication Data
US 2016/0227586 A1    Aug. 4, 2016

(30) Foreign Application Priority Data
Sep. 26, 2013  (CN) .......................... 2013 1 0446677

(51) Int. Cl.
*H04W 74/08*    (2009.01)
*H04W 76/02*    (2009.01)
(Continued)

(52) U.S. Cl.
CPC ..... *H04W 74/0833* (2013.01); *H04W 56/001* (2013.01); *H04W 74/08* (2013.01);
(Continued)

(58) Field of Classification Search
CPC .......... H04W 74/0833; H04W 56/001; H04W 74/08; H04W 76/028; H04W 56/00; H04W 84/045
(Continued)

(56) References Cited

U.S. PATENT DOCUMENTS 8,265,025 B2    9/2012 Imamura et al.
2012/0257601 A1   10/2012 Kim et al.
(Continued)

FOREIGN PATENT DOCUMENTS

CN    101389121 A    3/2009
CN    102869113 A2    1/2013
(Continued)

OTHER PUBLICATIONS

PCT International Search Report dated Jul. 16, 2014, Application No. PCT/CN2014/075506, 3 Pages.
(Continued)

*Primary Examiner* — Obaidul Huq
(74) *Attorney, Agent, or Firm* — Plumsea Law Group, LLC

(57) ABSTRACT

A random access method and device relate to the field of mobile communication, and solve the problem of triggering a random access procedure of a small cell. The method comprises a terminal detecting whether a small cell random access condition is satisfied at present; the terminal automatically initiating a random access procedure of a small cell when the small cell random access condition is satisfied. The technical scheme provided in the embodiments of the present document is applicable to the LTE system, and the random access mechanism of a small cell is achieved.

10 Claims, 4 Drawing Sheets

(51) Int. Cl.
*H04W 56/00* (2009.01)
*H04W 84/04* (2009.01)

(52) U.S. Cl.
CPC .......... *H04W 76/028* (2013.01); *H04W 56/00* (2013.01); *H04W 84/045* (2013.01)

(58) Field of Classification Search
USPC ........................................ 370/310, 328, 329
See application file for complete search history.

(56) References Cited

U.S. PATENT DOCUMENTS

| | | | |
|---|---|---|---|
| 2013/0182688 A1 | 7/2013 | Damnjanovic et al. | |
| 2013/0250902 A1* | 9/2013 | Xu ...................... | H04W 74/006 370/329 |
| 2014/0135018 A1* | 5/2014 | Hedberg ............... | H04W 48/20 455/437 |
| 2014/0153517 A1 | 6/2014 | Chen et al. | |
| 2014/0171091 A1* | 6/2014 | Cai ...................... | H04W 48/20 455/450 |
| 2014/0192798 A1* | 7/2014 | Yang ................. | H04W 56/0045 370/350 |
| 2014/0293896 A1* | 10/2014 | Kuo .................. | H04W 72/0413 370/329 |
| 2014/0295860 A1* | 10/2014 | Kuo ...................... | H04W 24/02 455/450 |
| 2014/0334389 A1* | 11/2014 | Abdel-Samad ....... | H04W 76/06 370/329 |
| 2016/0021581 A1* | 1/2016 | Deenoo ............. | H04W 36/0055 370/331 |

FOREIGN PATENT DOCUMENTS

| | | |
|---|---|---|
| EP | 2323304 A2 | 5/2011 |
| WO | 2008041582 A1 | 4/2008 |
| WO | 2011063244 A2 | 5/2011 |
| WO | 2013010576 A1 | 1/2013 |

OTHER PUBLICATIONS

Extended European Search Report dated Jul. 14, 2016, Application No. 14792059.9-1857 3035766 PCT/CN2014075506, Applicant ZTE Corporation, 6 Pages.

* cited by examiner

RANDOM ACCESS METHOD AND DEVICE

CROSS-REFERENCE TO RELATED APPLICATIONS

This application is a U.S. national phase of PCT Application No. PCT/CN2014/075506, filed Apr. 16, 2014, which claims priority to Chinese Application No. 201310446677.3, filed Sep. 26, 2013, the disclosures of which are incorporated in their entirety by reference herein.

TECHNICAL FIELD

The present document relates to the field of mobile communication, and more particularly, to a method and device for triggering random access of a small cell.

BACKGROUND OF THE RELATED ART

In the LTE system, the UE in the connected state needs to obtain uplink synchronization and downlink synchronization with the base station before sending data to the base station. A UE has performed measurement on some cell, i.e., obtaining downlink synchronization with the cell; otherwise, the procedure similar to cell searching needs to be carried out. The uplink synchronization is obtained by carrying out a random access procedure (the Time Advance (TA in short) of sending is obtained simultaneously), the main usage of TA is for UE to determine the moment of data sending; after UE obtaining uplink synchronization, the time Alignment Timer (TAT in short) of uplink synchronization is started; if the UE receives the TA sent from the base station to the UE before the TAT expires, it will be deemed that the UE keeps uplink synchronization with the base station; otherwise, the TAT expires, the UE is deemed to lose uplink synchronization, and the terminal only releases relevant resources and notifies the PRC layer. After the terminal loses the uplink synchronization, if it still needs to send data to the base station, the uplink synchronization needs to be re-obtained. Since the cells only have one carrier in the LTE system, there is only one TA. The UE will carry out a random access procedure under the following several conditions: initial access from IDLE state, RRC connection re-establishment, handoff, DL (Downlink) data arrival, UL (Uplink) data arrival, and location service, wherein the handoff and the DL data arrival are the random access procedures which need to be carried out by receiving indication requirement from the base station. In addition, the terminal will perform radio link failure (RLF) monitoring on the serving cell; if occurrence of the RLF is detected in the serving cell, the RRC connection re-establishment will be triggered; the cell selection procedure is first carried out, then the random access procedure is carried out on the selected cell.

After the introduction of the carrier aggregation (CA in short) technique, the UE can simultaneously communicate with the source base station through multiple component carriers (such as CC1, CC2) after entering the connection state, and the Primary Cell (Pcell) and the Secondary Cell (Scell) are introduced. Due to the increase of the amount of data, the number of Scells will be increased, such as being increased to 4, the scene will also be relaxed, such as supporting uplink RRH and repeater; one TA cannot solve the problem, so multiple TAs will be introduced. For the ease of management, the serving cells using the same TA are classified as one TA group, the TA group including the Pcell is called PTAG, the TA group not including the Pcell is called STAG. When the UE is on the PTAG, the timing for the Pcell to perform random access is the same as that in the case of one TA; When the UE is on the STAG, the timing for the cell to perform random access is only one, that is, a network side notification. Further, the RLF (Radio link failure) monitoring is only conducted on the Primary Cell; if occurrence of the RLF is detected in the serving cell, the RRC connection re-establishment will be triggered. The Secondary Cell does not perform the RLF monitoring.

Due to the deficiency of spectrum resource, and the sharp increase of the traffic with large flow of the mobile subscriber, the demand for using high frequency point, such as 3.5 GHz, to conduct hotspot coverage is increasingly apparent, and using lower-power nodes becomes a new application scene with the object of increasing the throughput of the users and enhancing the mobility performance. Due to the considerable signal attenuation of the high frequency point, the coverage range of a small cell is relatively small, without common sites with the existing cells, many companies and operators currently tend to seek a new enhancing solution, and the Dual-Connection is one of them. The terminal in the Dual-Connection can maintain data connection with more than two network nodes at the same time, and the control connection only exists in one network node. Regarding how to trigger the random access procedure of a small cell, there is no technical solution disclosed yet.

SUMMARY

The present document provides a random access method and device, and solves the problem of triggering a random access procedure of a small cell.

A random access method, comprises:

a terminal detecting whether a small cell random access condition is satisfied at present;

the terminal automatically initiating a random access procedure of a small cell when satisfying the small cell random access condition.

Preferably, the small cell random access condition comprises:

when a small cell is added, the newly added small cells and configured cells use different TAs, wherein the cells comprise a cell and/or a small cell.

Preferably, the small cell random access condition comprises:

a TAT maintained on a macrocell is operating, and a TAT maintained on a small cell expires.

Preferably, the small cell random access condition comprises:

a TAT maintained on a small cell expires, and a TAT maintained on a macrocell is restarted.

Preferably, the small cell random access condition comprises:

RLF monitoring is performed on small cells, and an RLF is detected.

Preferably, said satisfying the small cell random access condition specifically is satisfying any one or more of the small cell random access conditions.

Preferably, the method further comprises:

when a base station indicates that the newly added small cell of the terminal and the configured cells use a same TA, the terminal directly sending and receiving data via the newly added small cell.

The present document also provides a random access device, comprising:

a detection module, configured to detect whether a small cell random access condition is satisfied at present;

a random access trigger module, configured to automatically initiate a random access procedure of a small cell when the small cell random access condition is satisfied.

Preferably, the random access trigger module is configured to automatically initiate a random access procedure of a small cell when satisfying any one or more of the small cell random access conditions.

Preferably, the device further comprises:

a direct transceiving module, configured to directly send and receive data via a newly added small cell when a base station indicates that the newly added small cell of the terminal and configured cells use a same TA.

The embodiments of the present document provide a random access method and device, wherein a terminal detects whether a small cell random access condition is satisfied at present, and the terminal automatically initiates a random access procedure of a small cell when the small cell random access condition is satisfied. The random access mechanism of a small cell is achieved, and the problem of triggering a random access procedure of a small cell is solved.

PREFERRED EMBODIMENTS

Figure 1:
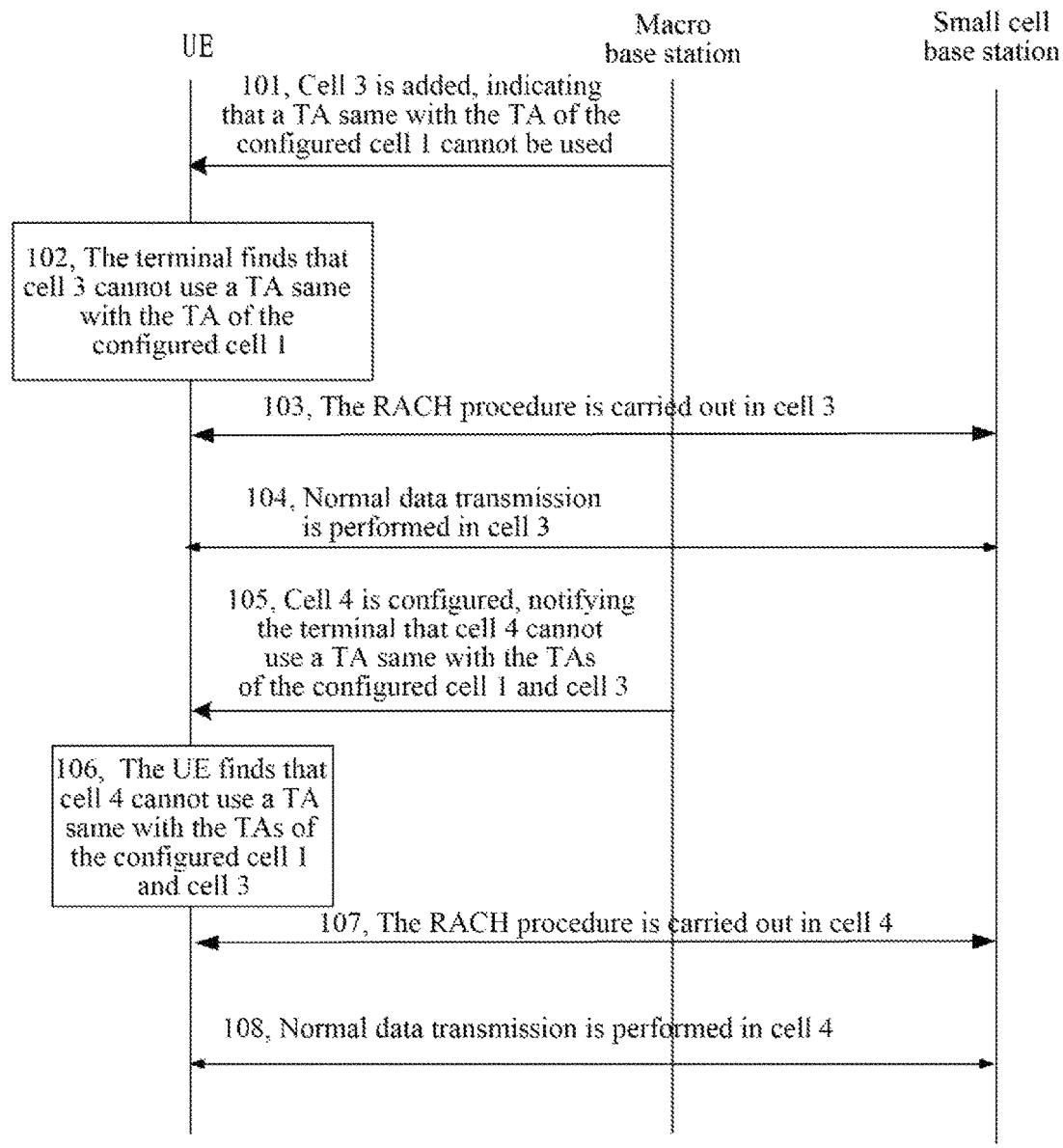
FIG. 1 is a flow diagram of a random access method according to the first embodiment of the present document.

Regarding how to trigger the random access procedure of a small cell, there is no technical solution disclosed currently.

In order to solve the above problem, embodiments of the present document provide a random access method. The embodiments of the present document are described in detail with reference to the accompanying drawings hereinafter. It should be illustrated that, in the case of not conflicting, the embodiments in the present application and features in these embodiments can be combined with each other randomly.

In the following embodiments, base station 1 is a macro base station, and it has one cell which is cell 1; base station 2 is a small cell base station, and it has two cells which are cell 3 and cell 4 respectively. The following procedures are illustrated and role-exchanged based on the example that the control connection is on the macro base station, i.e., base station 1 is the small cell base station, base station 2 is the macro base station, the procedures are the same.

Embodiment One

The embodiment of the present document provides a random access method, wherein the terminal establishes a connection with cell 1, the macro base station issues a measurement task to the terminal, and receives the measurement report reported by the terminal, and the specific flow is as shown in FIG. 1, comprising:

in step 101, due to the increase of the traffic, the macro base station, according to the measurement report, sends a configuration command to the terminal, notifies the terminal to add cell 3, the command carries the cell identification information of cell 3 and the indication information for indicating whether the cell 3 and the configured cell use the same TA;

in step 102, the terminal receives the configuration command, and finds that cell 3 is the first cell configured by the small cell base station, or finds that cell 3 needs to use a new TA (different from the TA used by the configured cell 1);

in step 103, the terminal carries out a random access procedure in cell 3;

in step 104, the terminal can send and receive data normally in cell 3 after the random access procedure is completed;

in step 105, due to a big increase of the traffic, the macro base station adds cell 4 to the terminal according to the measurement report, and notifies the terminal that cell 4 uses a TA different from the TAs of cell 1 and cell 3;

in step 106, the terminal receives the configuration command, finding that cell 4 uses a TA different from the TAs of cell 1 and cell 3;

in step 107, the terminal carries out the random access procedure in cell 3; and in step 108, the terminal can send and receive data normally in cell 4 as the above steps 104 and 105 after the random access procedure is completed.

In particular, if the base station notifies the terminal of that cell 4 and cell 3 can use the same TA, then the terminal does not need to carry out the random access procedure, and directly sends and receives data normally in cell 4.

Embodiment Two

Figure 2:
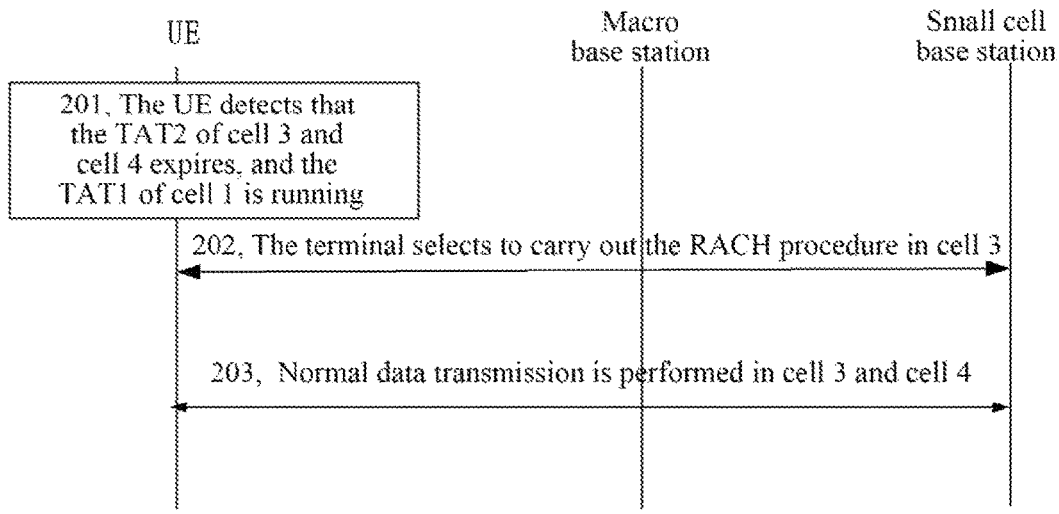
FIG. 2 is a flow diagram of a random access method according to the second embodiment of the present document.

The embodiment of the present document provides a random access method. The terminal establishes a connection with cell 1; due the increase of the traffic, cell 3 and cell 4 are further configured; at this time, the terminal is configured with cell 1, and cell 3, cell 4, wherein cell 3 and cell 4 may use the same TA, the terminal respectively manages the TAT1 of cell 1, the TAT2 of cells 3 and 4, both the lengths of TAT1 and TAT2 are configured for the terminal by the macro base station, and the two can be the same or different. The specific flow is as shown in FIG. 2, comprising:

in step 201, at Moment I, the terminal detects that the TAT2 expires; at this time, the TAT1 is operating;

in step 202, according to the signal quality of cells 3 and 4 relevant to the TAT2, the terminal selects cell 3 with slightly better signal quality to carry out the random access procedure, or randomly selects cell 3 or cell 4 relevant to the TAT2; at this time, the cell 3 carries out the random access procedure; and in step 203, the terminal can send and receive data normally in cell 3 and cell 4 after the random access procedure is completed.

In the above steps, if cell 3 and cell 4 do not use the same TA, they will respectively manage their own TAT2 and TAT3, i.e., when the TAT3 expires, for example, only the data sending and receiving of cell 3 is affected, and only cell 4 will be triggered to carry out the random access procedure without affecting cell 3; the terminal carries out the random access procedure in cell 4, restoring the normal data sending and receiving in cell 4 after the random access procedure is completed.

In the above step 202, the terminal does not carry out the random access procedure, but deletes cell 3 and cell 4 relevant to the TAT2, and then carries out the random access procedure, as the procedure shown in Embodiment One, by the time cell 3 or cell 4 is added.

Embodiment Three

Figure 3:
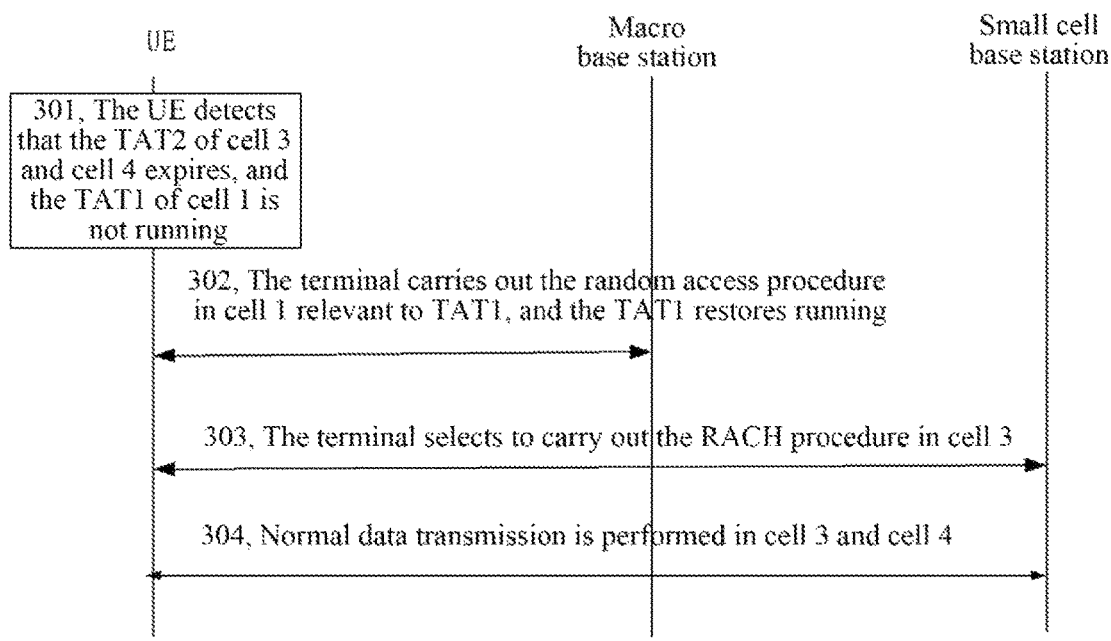
FIG. 3 is a flow diagram of a random access method according to the third embodiment of the present document.

The present document provides a random access method. The terminal establishes a connection with cell 1; due to the increase of the traffic, cell 3 and cell 4 are further configured, at this time, the terminal is configured with cell 1 and cell 3, cell 4, wherein both cell 3 and cell 4 can use the same TA; and the terminal respectively manages the TAT1 of cell 1 and the TAT2 of cell 3 and cell 4. The specific flow is as shown in FIG. 3, comprising:

in step 301, at Moment I, the terminal detects that the TAT2 expires; at this time, the TAT1 is not running;

in step 302, the terminal carries out the random access procedure in cell 1 relevant to the TAT1; TAT1 restores running;

in step 303, after the TAT1 runs, the terminal, according to the signal quality of cell 3 and cell 4 relevant to the TAT2, selects cell 3 with slightly better signal quality to carry out the random access procedure, or randomly selects cell 3 or cell 4 relevant to the TAT2; at this time, the cell 3 carries out the random access procedure; and in step 304, the terminal can send and receive data normally in cell 3 and cell 4 after the random access procedure is completed.

Embodiment Four

Figure 4:
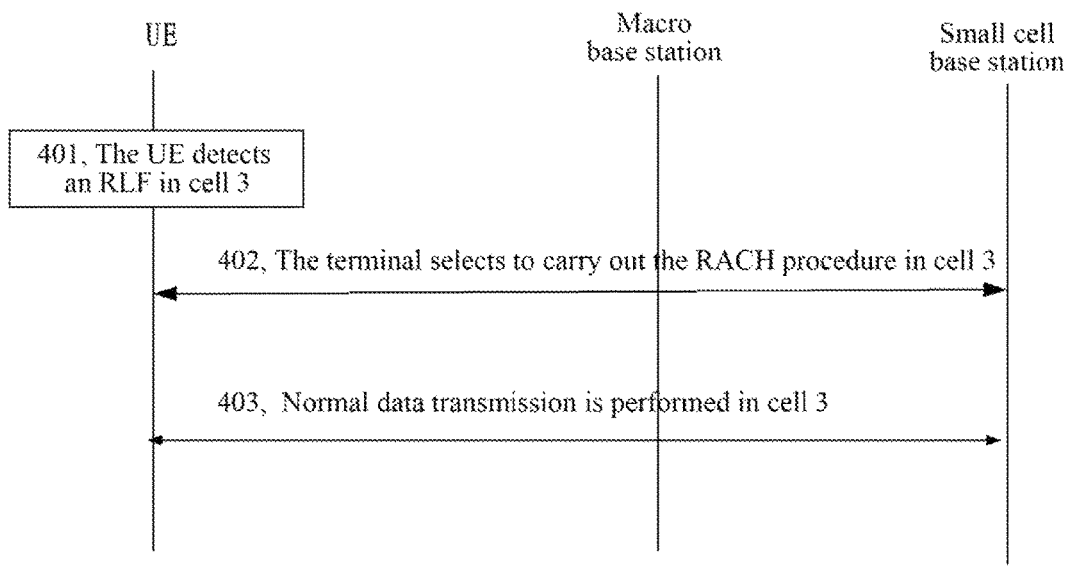
FIG. 4 is a flow diagram of a random access method according to the fourth embodiment of the present document.

The present document provides a random access method. The terminal establishes a connection with cell 1; due to the increase of the traffic, cell 3 and cell 4 are further configured; at this time, the terminal is configured with cell 1 and cell 3, cell 4, wherein cell 3 and cell 4 can use the same TA, the terminal successfully accesses cell 3 and cell 4, and sends and receives data normally in cell 3 and cell 4. The specific flow is as shown in FIG. 4, comprising:

in step 401, at Moment I, the terminal detects the occurrence of RLF in cell 3; in step 402, according to the signal quality of cell 3 and cell 4 using the same TA, the terminal selects cell 4 with slightly better signal quality to carry out the random access procedure;

in step 403, the terminal can send and receive data normally in cell 3 and cell 4 after the random access procedure is completed.

In the above steps, if cell 3 and cell 4 do not use the same TA, they will respectively detect the RLF; if the RLF occurs in cell 3, only the data sending and receiving in cell 3 will be affected, only cell 3 is triggered to carry out the random access procedure without affecting cell 4; the terminal carries out the random access procedure in cell 3, and restores the normal data sending and receiving in cell 3 after the random access procedure is completed.

It needs to be illustrated that the above embodiments are described with respect to Dual-Connection. As to the scene of Triple Connection and Quadruple Connection, its principle and procedure are the same. No description will be repeated.

Embodiment Five

Figure 5:
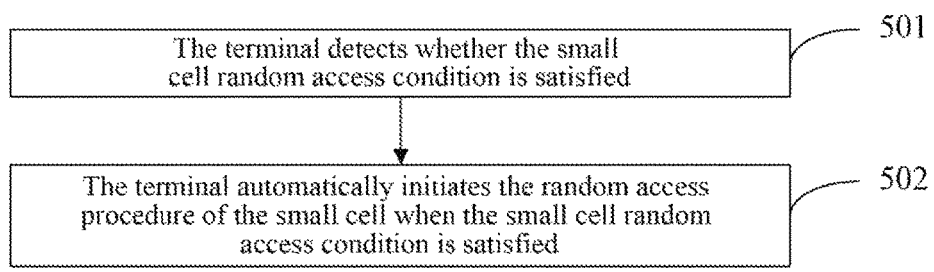
FIG. 5 is a flow diagram of a random access method according to the fifth embodiment of the present document.

The present document provides a random access method. The terminal has accessed one or more cells or small cells, the flow of using the random access method provided by the embodiment of the present document to complete the small cell random access is as shown in FIG. 5, comprising:

in step 501, the terminal detects whether the small cell random access condition is satisfied at present;

in this step, the related small cell random access condition mainly comprises the following any one or more of conditions:

when a small cell is added, the newly added small cells and configured cells use different TAs; the configured cells comprise a cell and/or a small cell;

the TAT maintained on a macrocell is running, the TAT maintained on a small cell expires;

when the TAT maintained on a small cell expires, the TAT maintained on a macrocell is restarted;

RLF monitoring is performed on the small cells, and the RLF is detected.

In step 502, the terminal automatically initiates the random access procedure of the small cell when the small cell random access condition is satisfied;

in this step, the terminal can automatically initiate the random access procedure of the small cells when satisfying any one or more of the small cell random access conditions.

It needs to be illustrated that, when the small cell random access condition is "when a small cell is added, the newly added small cell uses a TA different from the TAs used by the existing cells or small cells", if the base station indicates that the small cell newly added on the terminal and the configured cells (cell or small cells) use the same TA, the terminal will not carry out the random access, and directly sends and receives data via the newly added small cell.

Embodiment Six

Figure 6:
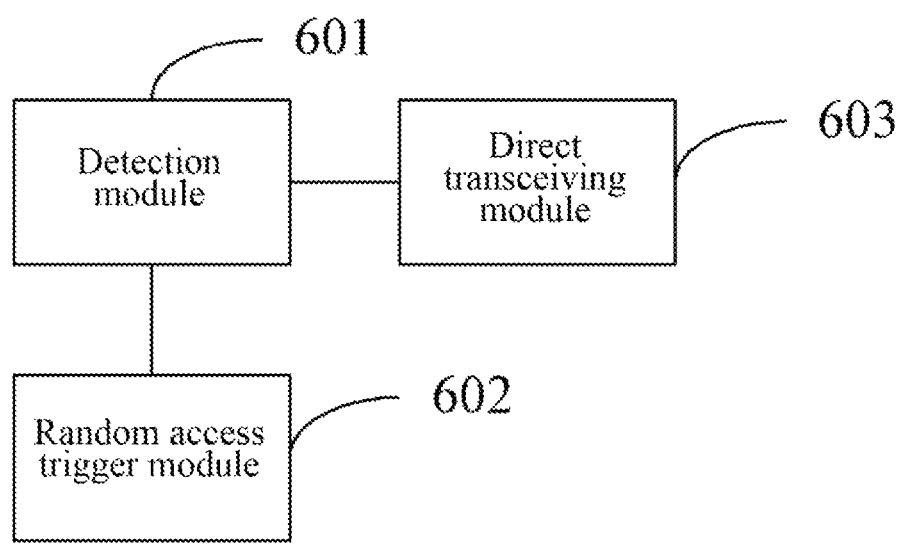
FIG. 6 is a structural diagram of a random access device according to the sixth embodiment of the present document.

The embodiment of the present document provides a random access device, and its structure is as shown in FIG. 6, comprising:

a detection module 601, used to detect whether a small cell random access condition is satisfied at present;

a random access trigger module 602, used to automatically initiate a random access procedure of a small cell when the small cell random access condition is satisfied.

The relevant description of the small cell random access condition may refer to Embodiments one to five of the present document. No description will be repeated here.

Preferably, the random access trigger module 602 is specifically used to automatically initiate a random access procedure of a small cell when satisfying any one or more of the small cell random access conditions.

Preferably, the device further comprises:

a direct transceiving module 603, used to directly send and receive data via a newly added small cell when a base station indicates that the newly added small cell of the terminal and configured cells use the same TA.

The above random access device can be integrated into the terminal where the corresponding function is completed.

Anyone skilled in the art can understand that all or part of the steps in the above embodiments can be achieved by using the computer program flow; the computer program can be stored in a computer-readable storage medium; the computer program is carried out on a corresponding hardware platform (such as system, device, apparatus, and component, etc.); one or a combination of the steps of the method embodiment is included when carrying out.

Alternatively, all or part of the steps in the above embodiments can also be achieved by using integrated circuit; these steps can be made into integrated circuit modules respectively, or the several modules or steps thereof are made into a single integrated circuit module. In this way, the present document is not limited to any specific combination of hardware and software.

Each device, function module and function unit in the above embodiments can be achieved by using a general calculating device, which can be integrated in a single calculating device, and also can be distributed in the network consisting of multiple calculating devices.

Each device, function module and function unit in the above embodiments is achieved in the form of software function module, is sold or used as an independent product, and can be stored in a computer-readable storage medium. The above mentioned computer-readable storage medium can be read-only memory, disk or compact disk and the like.

The variations or substitutions that can be readily conceived by anyone skilled in the art within the technical scope of the disclosure of the present document should be covered in the protection scope of the present document. Therefore, the protection scope of the present document should be based on the scope defined by the claims.

INDUSTRIAL APPLICABILITY

The embodiments of the present document provide a random access method and device; the terminal detects whether a small cell random access condition is satisfied at present; the terminal automatically initiates a random access procedure of a small cell when the random small cell access condition is satisfied. The random access mechanism of a small cell is achieved, and the problem of triggering a random access procedure of a small cell is solved.

What we claim is:

1. A random access method, comprising:
    a terminal detecting whether a small cell random access condition is satisfied at present; wherein the small cell random access condition comprises:
    when a small cell is added, the newly added small cell and configured cells use different time advances (TAs), wherein the cells comprise a cell and/or a small cell;
    the terminal automatically initiating a random access procedure of a small cell when the newly added small cell and configured cells use different TAs;
    the terminal directly sending and receiving data via the newly added small cell when a base station indicates that the newly added small cell of the terminal and the configured cells use a same TA.

2. The random access method according to claim 1, wherein the small cell random access condition comprises:
    a time alignment timer (TAT) maintained on a macrocell is running, and a TAT maintained on a small cell expires.

3. The random access method according to claim 2, wherein said satisfying the small cell random access condition specifically is satisfying any one or more of the small cell random access conditions.

4. The random access method according to claim 1, wherein the small cell random access condition comprises:
    a time alignment timer (TAT) maintained on a small cell expires, and a TAT maintained on a macrocell is restarted.

5. The random access method according to claim 4, wherein said satisfying the small cell random access condition specifically is satisfying any one or more of the small cell random access conditions.

6. The random access method according to claim 1, wherein the small cell random access condition comprises:
    radio link failure (RLF) monitoring is performed on small cells, and an RLF is detected.

7. The random access method according to claim 6, wherein said satisfying the small cell random access condition specifically is satisfying any one or more of the small cell random access conditions.

8. The random access method according to claim 1, wherein said satisfying the small cell random access condition specifically is satisfying any one or more of the small cell random access conditions.

9. A random access device, comprising:
    a detection module, configured to detect whether a small cell random access condition is satisfied at present; wherein the small cell random access condition comprises:
    when a small cell is added, the newly added small cell and configured cells use different time advances (TAs), wherein the cells comprise a cell and/or a small cell;
    a random access trigger module, configured to automatically initiate a random access procedure of a small cell when the newly added small cell and configured cells use different TAs;
    a direct transceiving module, configured to directly send and receive data via a newly added small cell when a base station indicates that the newly added small cell of the terminal and configured cells use a same TA.

10. The random access device according to claim 9, wherein the random access trigger module is configured to automatically initiate a random access procedure of a small cell when satisfying any one or more of the small cell random access conditions.

* * * * *